US006896465B2

(12) United States Patent
Andersson

(10) Patent No.: US 6,896,465 B2
(45) Date of Patent: May 24, 2005

(54) MOUNTING ELEMENT AND METHOD OF MANUFACTURING THE SAME

(75) Inventor: Mattias Andersson, Östersund (SE)

(73) Assignee: Nord-Lock AB, Mattmar (SE)

( * ) Notice: Subject to any disclaimer, the term of this patent is extended or adjusted under 35 U.S.C. 154(b) by 30 days.

(21) Appl. No.: 10/381,763

(22) PCT Filed: Oct. 9, 2001

(86) PCT No.: PCT/SE01/02192

§ 371 (c)(1), (2), (4) Date: May 9, 2003

(87) PCT Pub. No.: WO02/31368

PCT Pub. Date: Apr. 18, 2002

(65) Prior Publication Data

US 2003/0190218 A1 Oct. 9, 2003

(30) Foreign Application Priority Data

Oct. 12, 2000 (SE) .............................................. 0003679

(51) Int. Cl.[7] ................................................ F16B 39/24
(52) U.S. Cl. ........................................ 411/533; 411/149
(58) Field of Search ................................ 411/149, 150, 411/533

(56) References Cited

U.S. PATENT DOCUMENTS 4,969,788 A * 11/1990 Goiny ......................... 411/428
5,080,545 A * 1/1992 McKinlay ................... 411/149
5,203,656 A 4/1993 McKinlay
5,626,449 A * 5/1997 McKinlay ................... 411/149
5,688,091 A * 11/1997 McKinlay ................... 411/149
5,897,277 A * 4/1999 Barre et al. ................. 411/331
6,039,524 A 3/2000 McKinlay
6,554,555 B2 * 4/2003 Imahigashi ................. 411/533
6,592,314 B1 * 7/2003 Wilson ....................... 411/429

FOREIGN PATENT DOCUMENTS

| | | |
|---|---|---|
| EP | 0131556 | 1/1985 |
| SE | 348809 | 9/1972 |
| WO | WO 0026547 | 11/2000 |

* cited by examiner

*Primary Examiner*—Flemming Saether
(74) *Attorney, Agent, or Firm*—Ware, Fressola, Van der Sluys & Adolphson LLP

(57) ABSTRACT

The present invention concerns a mounting element (2, 10, 50, 1000) comprising a means of fastening (4, 12, 53, 102) such as a nut or bolt and an upper washer (14) and a lower washer (16) constituting a pari of washers, where each washer has one side with cams (18, 20) and one principally flat side (22, 24), the washer sides with cams being arranged facing each other. Moreover, the means of fastening includes a principally flat side (26) arranged against a principally flat upper side (22) of the upper washer (14). The said mounting element furthermore includes at least one means of containment (28) arranged to keep together the means of fastening and the pair of washers, whereby the means of containment is allowed a certain axial movement and rotation in relation to the means of fastening or the movement of the pair of washers. The present invention concerns also a means of manufacturing a mouting element and a usage.

12 Claims, 5 Drawing Sheets

10 12 42 28 34 30 22 18 38 40 14 16 40 32 43 20 26 36 24

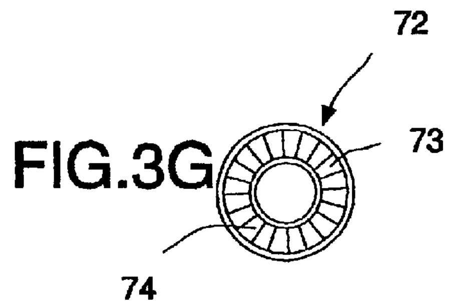
72
73
FIG.3G
74
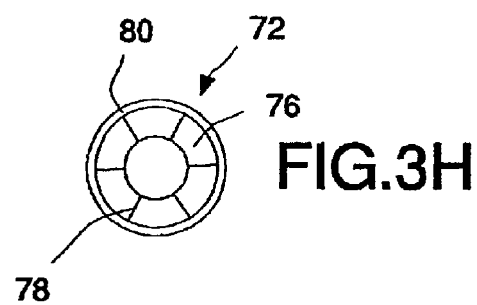
80
72
76
FIG.3H
78
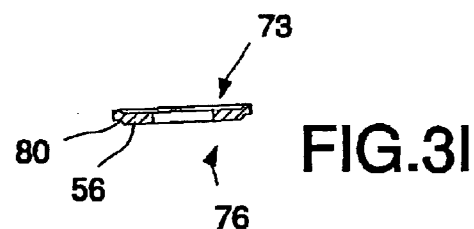
73
80
56
76
FIG.3I
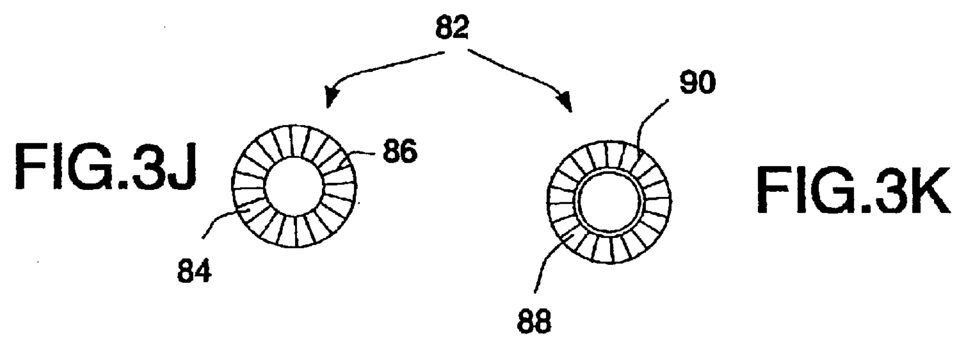
82
90
FIG.3J
86
84
FIG.3K
88
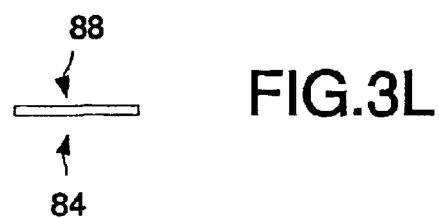
88
FIG.3L
84

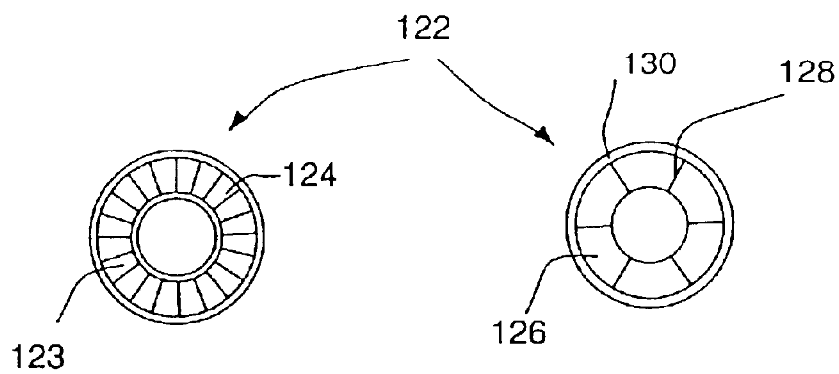
FIG.4E
FIG.4F
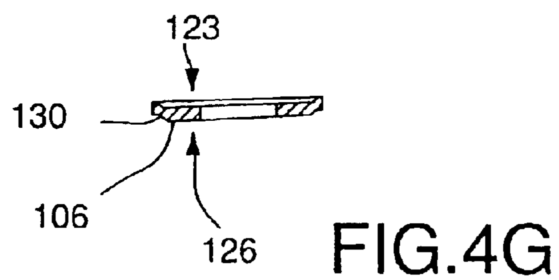
FIG.4G
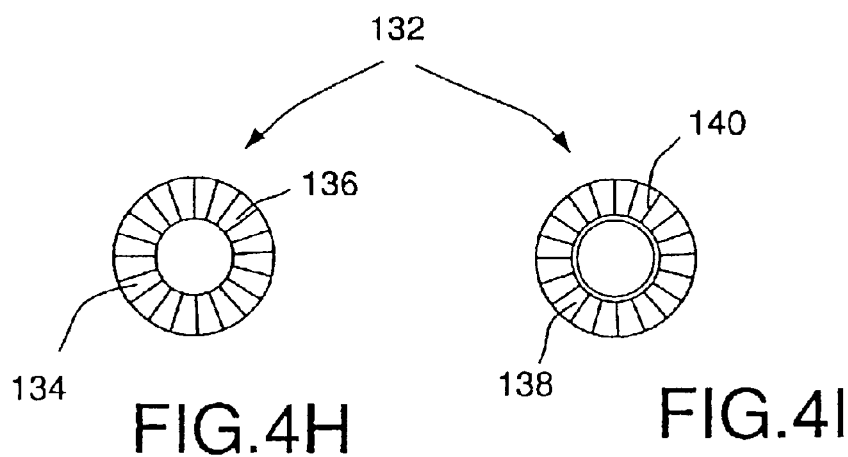
FIG.4H
FIG.4I
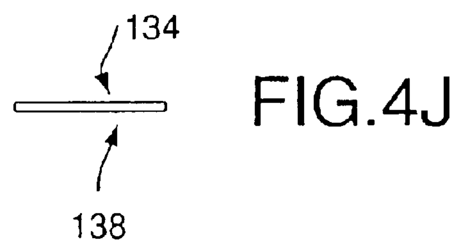
FIG.4J

MOUNTING ELEMENT AND METHOD OF MANUFACTURING THE SAME

BACKGROUND OF THE INVENTION

1. Technical Field

The present invention concerns a mounting element comprising a means of fastening such as a nut or a bolt. The present invention concerns also a means of manufacturing a mounting element.

2. Description of the Background Art

In connection with the use of a means of fastening such as nuts and bolts, other components such as washers are often also used to provide an enhanced securement of the means of fastening. The present invention is aimed at the type of mounting element that includes a means of fastening such as a nut or bolt that utilizes an upper and a lower washer. The washers form a pair, where each washer has one side with tags thereon that are used facing each other. Each tagged side fits against the tagged side of the corresponding washer. The other side of each washer is principally flat. The means of fastening has also a principally flat side arranged against the principally flat and smooth upper side of the upper washer, which faces the said side of the means of fastening. This known form of mounting element provides a very secure and reliable means of locking, which minimizes deformation of the surface it is intended to be locked against. An example of this type of mounting element comprising specially designed components is a cam actuated lock nut comprising a flange nut with pair of washers as described above. The cam actuated locking function is achieved when the nut slides against the washer closest below it when tightened. The bottom washer located closest to the surface should cause an little deformation of the surface as possible while achieving maximum locking effect. For releasing, the washer inunediately under the nut slides over the tags on the bottom washer since there is least friction between the two. The difference in pitch between the tags and the thread provide an increase in tension when unscrewing. The nut will not tend to come loose when exerted to vibration as this is counteracted by the tension in the screwed union. The pitch of the tags varies depending on the pitch of the thread for which the washers are intended to be used and their shape can also vary. If washers are fitted incorrectly or turned the wrong way around, or if the wrong washers are used, this will cause the cam actuated locking function to fail so that the nut can easily come loose if e.g. subjected to vibration. Control of the tension will also be lost.

Nuts comprising two parts, nut and washer, are already known. The nut has tags that fit the tags on the washer. This is another type of cam actuated lock nut where the nut is made with cams. The nut bottoms against the washer on tightening and the washer rotates against the surface, which will deform the surface if the washer is toothed. Without teeth on the washer, there is a risk that friction when unscrewing is lowest between the surface and the washer. This means that the cam actuated locking will not work and the nut can come loose if subjected to vibration.

Mounting elements comprising several parts are also previously known. These mounting elements have a nut with cams, one upper washer with cams on both sides and one lower washer with cams on one side. When tightening, the upper washer slides over the cams on the lower washer and if vibration should occur, the upper washer and the nut can rotate on the lower washer, resulting in a reduction of tension if the friction between the upper washer and the lower washer is less than the friction between the nut and the upper washer.

When fitting a mounting element, it is awkward to have several loose and separate components that must be applied together, especially if the actual fitting of the mounting element on the surface must be done in places that are difficult to access. From the point of view of handling, it is also a disadvantage to have to keep track of and manage several loose components. Furthermore, it is of the greatest importance and also important from a safety point of view that certain components, such as washers of a special design intended for special mounting purposes, are fitted in a certain way, in an exact position and, above all, that all necessary components are actually fitted by the person performing the task.

The method of holding washers together with a nut by upsetting an inside flange after fitting is previously known. It is also known to have a lower washer with a high outside flange, where the flange is upset after fitting the component parts of the nut. This is a complicated method of manufacture and is economically disadvantageous. Since mounting elements are manufactured in large volumes, each increase in manufacturing capacity is of great importance.

Through WO-A1-0026547, a mounting element is previously known that comprises a washer closest to the means of fastening. The means of fastening and the washer both have cams facing each other. The washer also has cams on the opposite side facing another fastening component included in the mounting element, which is arranged between the said washer and the surface to which the mounting element is intended to lock against. This mounting element includes cams facing the said washer. This fastening component also serves as a containment sleeve for the component parts of the mounting element. The function of this mounting element according to WO-A1-0026547, however, is completely different to the mounting element according to the present invention, the function of which is described above. WO-A1-0026547 does not provide a solution to the problem as described according to prior art.

SUMMARY OF THE INVENTION

The present invention intends to eliminate the aforesaid disadvantages according to the prior art described above. The object is also to produce a mounting element comprising several components of the type where included pairs of washers have cams only on the sides facing each other and which components are held together in one unit. Another intention is to produce a mounting element that is simplified and economical from a manufacturing point of view.

The mounting element and the usage according to the present invention solve the aforesaid problems and are distinguished in the said objects by what is evident in the patent claims. In that respect, the present invention concerns a mounting element comprising a means of fastening such as a nut or bolt and an upper washer and a lower washer constituting a pair of washers, where each washer has one side with cams and one principally flat side, the washer sides with cams being arranged facing each other. Moreover, the means of fastening includes a principally flat side arranged against a principally flat upper side of the upper washer. The said mounting element furthermore includes at least one means of containment arranged to keep together the means of fastening and the pair of washers, whereby the means of containment is allowed a certain axial movement and rotation in relation to the means of fastening or the movement of the pair of washers.

One advantage with the solution according to the present invention is that the mounting element is favorable from a manufacturing point of view and provides optimum locking reliability in relation to conventional methods and designs. The mounting element components are easy to assemble into one unit. Deep drawing (a manufacturing method for producing flanges) is not necessary during the manufacture of the washers. The unique locking function of the mounting element does not score the surface since when being tightened, the means of fastening slides on the upper washer and when being unscrewed, the upper washer slides on the lower washer. The mounting element locks when the lower washer grips the surface. The means of fastening is also easy to manufacture, such as the bolt without cams and the nut without cams and inside flange respectively.

According to a preferred embodiment of the present invention, the means of containment is sleeve-shaped in the form of a surrounding sleeve. The means of containment is arranged externally and surrounds at least one part of the means of fastening and the washer/washers. The means of containment is arranged loosely and is not fixed to any of the other components in the mounting element. Moreover, the means of containment has a flange with its lower side directed towards a surface on which the mounting element is arranged. This lower side of the means of containment can thereby be arranged with its flange at a collar arranged at the lower edge of the lower washer. The lower flange of the means of containment is thinner than the height of the shoulder, whereby the sleeve can run free of the surface on which the mounting element is fitted. Accordingly, the sleeve can be arranged with an air gap between the lower flange of the sleeve and the essentially flat part of the surface on which the mounting element is to be fitted. The means of containment is arranged with a certain free play around the other components of the mounting element. Vertically, this free play can be the same or more than the height of the cams on the washers, so that they can easily slide over the cams when unscrewing.

The height of the washer cams, i.e. the distance between the bottom and the top of the cams, varies depending on the thread pitch and the number of cams. The sides of the washers that are essentially smooth with respect to profile height can well include evenly distributed protrusions (also called teeth), i.e. in the form of pointed or rounded ridges or taper, the maximum height of which can be some tenths of a millimeter. The number of protrusions can vary to form a widely spaced or tightly spaced pattern. These protrusions provide friction between the sliding surfaces of the mounting element. The means of containment are preferably manufactured in a plastic material. The means of fastening such as bolts or nuts and washers in the present invention are conventionally manufactured in steel or another suitable material such as acid-resistant steel. These can be coated or uncoated. Washers and means of fastening are preferably surface treated. Since the nut slides on the upper washer when tightening, there will be no spread of torque due to the difference in material or surface treatment of the surface. The nut can well be fitted when all the components are surface treated without damaging the coating. In this way, it is possible to obtain a nut where all the surfaces of all metal components are surface treated.

The present invention also concerns a method of manufacturing a mounting element, which comprises a means of fastening such as a nut or bolt and an upper washer and a lower washer constituting a pair of washers, where each washer has one side with cams and one principally flat side, the washer sides with cams being arranged facing each other and the means of fastening also includes a principally flat side arranged against a principally flat upper side of the upper washer, the said mounting element furthermore including at least one means of containment arranged to keep together the means of fastening and the pair of washers, and also including the action of making the means of containment moveable on the mounting element and pair of washers, whereby the means of containment is allowed a certain axial movement and rotation in relation to the means of fastening or the movement of the pair of washers.

The present invention also concerns the usage of a loosely arranged sleeve on a mounting element or a method according to the patent claims.

BRIEF DESCRIPTION OF DRAWINGS

The invention will now be described in detail in the form of a non-limiting embodiment according to the present invention, illustrated with the help of the enclosed figures, where

FIGS. 3A–L are several views of the mounting element including a nut, a pair of washers and a sleeve.

FIGS. 4A–J are several views of the mounting element including a bolt, a pair of washers and a sleeve.

DETAILED DESCRIPTION OF THE INVENTION

Figure 1:
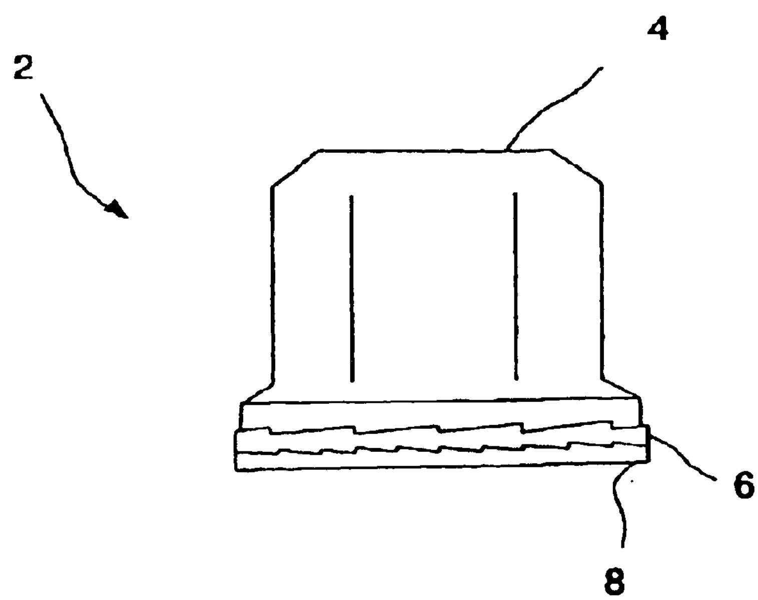
FIG. 1 is the side view of a mounting element according to prior art.

FIG. 1 shows a mounting element 2 according to prior art comprising a washer 6 closest to a nut 4. The nut 4 and the upper washer 6 both have cams facing each other. The washer 6 has cams on both sides with a lower washer 8 with cams on one side facing the upper washer 6. When tightening, the washer 6 slides over the cams on washer 8. In case of vibration, washer 6 and nut 4 can rotate on washer 8 if the friction between the upper washer and the lower washer is less than the friction between the nut and the upper washer. This will reduce the tension.

Figure 2:
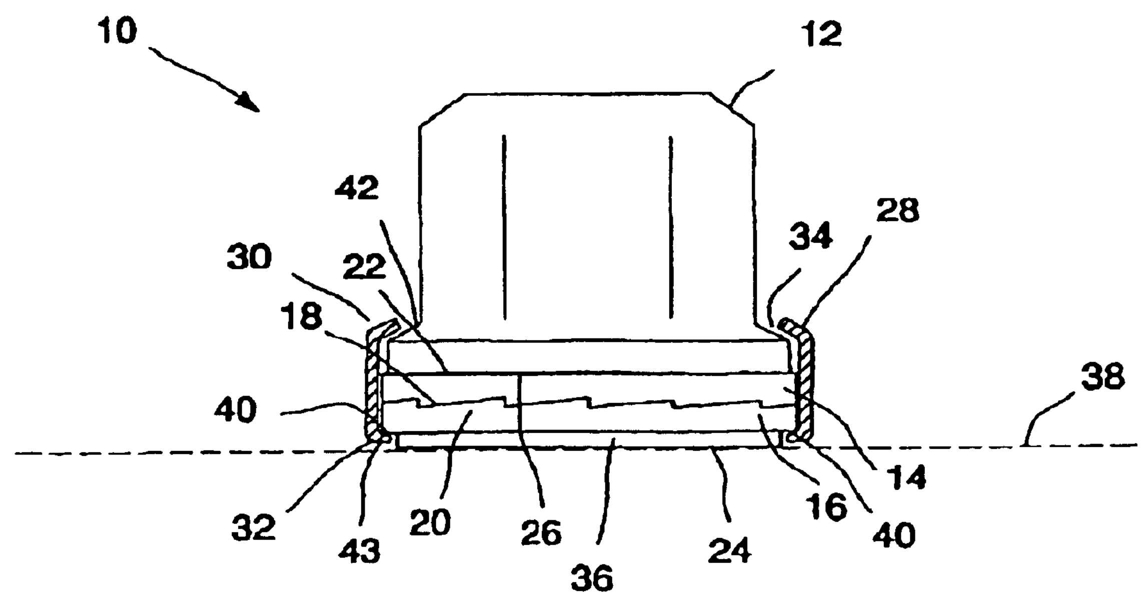
FIG. 2 is the side view of a mounting element according to the present invention.

FIG. 2 shows a mounting element 10 according to the present invention comprising a means of fastening 12, here shown in the form of a flange nut, an upper washer 14 and a lower washer 16, which both constitute a pair of washers. Each washer 14, 16 has one side with cams 18, 20 and one principally flat side 22, 24, the washer sides with cams being arranged facing each other. The means of fastening 12 comprises one principally flat side 26 arranged against the principally flat upper side 22 of the upper washer 14. The said mounting element 10 also includes at least one means of containment 28, here in the form of a sleeve arranged around the circumference of components 12, 14, 16, the sleeve of which is arranged to keep together the means of fastening 12 and the pair of washers 14, 16. The sleeve 28 is arranged freely and loosely on the means of fastening 12 and the pair of washers 14, 16. The sleeve can consequently move independently to the movement of the means of fastening or pair of washers. Between an upper flange 30 and a lower flange 32 of the sleeve 28 is an air gap, whereby the sleeve is consequently arranged on the mounting element with a certain free play 34. This free play can vary a few tenths of a millimeter in size. The free play of the sleeve however, is always the same or greater than the height of the cams on the washers 14, 16. The free play should preferably be within the range of approximately 0.1 mm up to approximately 0.8 mm. Furthermore, the lower washer 16 includes a shoulder 36, the surface 24 of which is intended to be arranged in contact with a surface 38. The shoulder 36 extends to a point close to the sides of washer 16, which exhibits a collar 40. The lower flange 32 of the sleeve 28 is arranged to be bent around the edge of this collar on washer 16. correspondingly, the upper flange 30 of the sleeve 28 is arranged to be bent around a flange 42 on the means of fastening. This means that the sleeve keeps together the mounting element at the same time as it is loosely fitted. The sleeve flange 32 is arranged in the collar 40 of the washer 16. The sleeve flange 32 is in that respect the same thickness or thinner than the shoulder 36 on the lower washer 16, whereby an air gap 43 can be formed between the lower flange 32 and the surface 38 when fitting the mounting element.

Figure 3A:
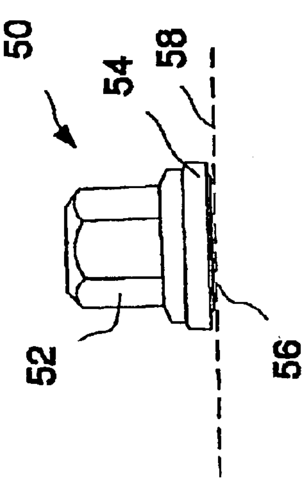
Figure 3B:
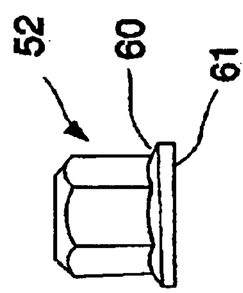
Figure 3C:
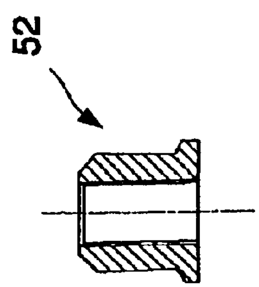
Figure 3D:
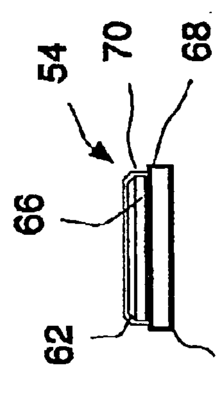
Figure 3E:
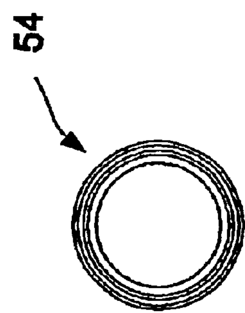
Figure 3F:
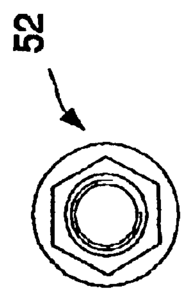

FIG. 3A shows the mounting element 50 comprising a flange nut 52 and a sleeve 54 . A pair of washers is arranged inside the sleeve. The lower washer has a shoulder 56 extending down below the bottom edge of the sleeve. This shoulder 56 is intended to make contact with and be arranged against the surface 58 on which the mounting element is to be locked. FIG. 3D shows the flange nut 52 from FIG. 3A with its flange 60. The bottom 61 is principally flat. FIG. 3C shows a cross section of the nut according to FIG. 3B. FIG. 3D shows a cross section of the sleeve 54 from FIG. 3A. The sleeve has an upper flange 62, which rests on the flange 60 of the nut and a lower flange 64. The upper part 66 of the sleeve has a slightly smaller circumference than the lower part 68, whereby the section between them forms a collar 70. FIG. 3E shows the plan view of the sleeve 54. FIG. 3F shows the nut 52 from FIG. 3B viewed from above. FIG. 3G shows a plan view of the lower washer 72, of which the cams 74 are arranged on the top side 73. FIG. 3H shows an inverse plan view of the bottom 76 of washer 72, which is to be arranged against the surface to which the mounting element is to be locked. The bottom 76 includes protrusions 78, here in the form of continuous ridges. The bottom is also designed with a shoulder 56 extending down below the bottom edge of the sleeve. Close to the outer edges of the washer, between the bottom 76 and the top 73, the shoulder turns into a flange 80 as exhibited in FIG. 3I in a cross-section viewed from the side. FIG. 3J and FIG. 3J shows plan views of the upper washer 82, FIG. 3J the top 84 with its protrusions 86 and FIG. 3K the bottom 88 with cams 90. FIG. 3L shows a side view of the upper washer.

Figure 4A:
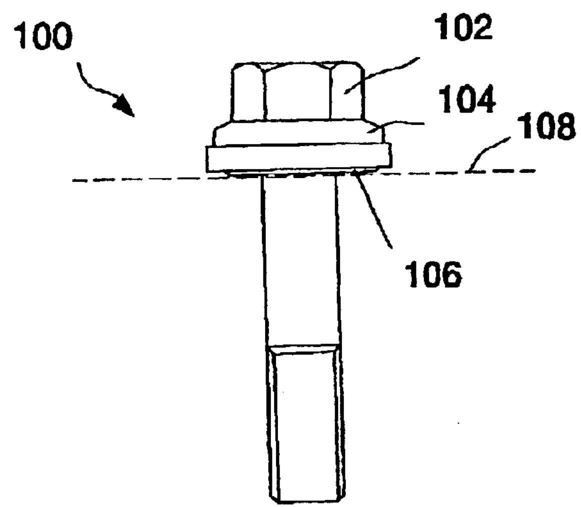
Figure 4B:
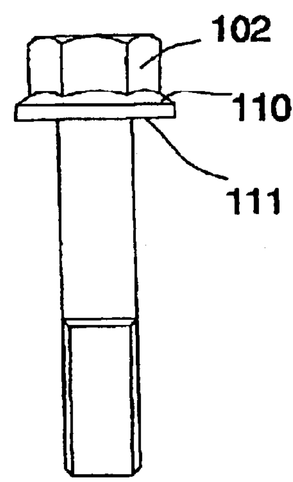
Figure 4C:
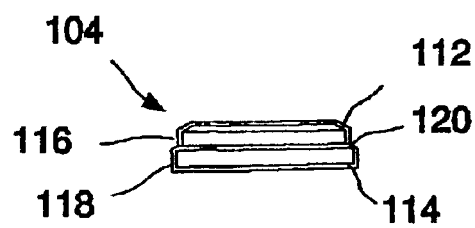
Figure 4D:
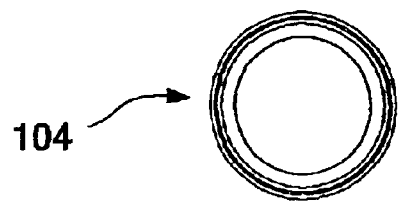

FIGS. 4A–I are several views of the mounting element including a bolt, a pair of washers and a sleeve. FIG. 4A shows the mounting element 100 comprising a bolt 102 and a sleeve 104. A pair of washers is arranged inside the sleeve. The lower washer has a shoulder 106 extending down below the bottom edge of the sleeve. This shoulder 106 is intended to make contact with and be arranged against the surface 108 on which the mounting element is to be locked. FIG. 4B shows the bolt 102 from FIG. 4A with its flange 110. The bottom of the bolt head 111 is principally flat. FIG. 4C shows a cross section of the sleeve 104 from FIG. 4A. The sleeve has an upper flange 112, which rests on the flange 110 of the bolt and a lower flange 114. The upper part 116 of the sleeve has a slightly smaller circumference than the lower part 118, whereby the section between them forms a collar 120. FIG. 4D shows the plan view of the sleeve 104. FIG. 4E shows a plan view of the lower washer 122, on the top side of which 123 is arranged cams 124. FIG. 4F shows an inverse plan view of the bottom 126 of washer 122, which is to be arranged against the surface to which the mounting element is to be locked. The bottom 126 includes protrusions 128, here in the form of continuous ridges. The bottom is also designed with a shoulder 106 extending down below the bottom edge of the sleeve. Close to the outer edges of the washer, between the bottom 126 and the top 123, the shoulder turns into a collar 130 as exhibited in FIG. 4G in a cross-section viewed from the side. FIG. 4H and FIG. 4I show plan views of the upper washer 132, FIG. 4H the top 134 with its protrusions 136 and FIG. 4I the bottom 138 with cams 140. FIG. 4J shows a side view of the upper washer.

What is claimed is:

1. Mounting element comprising:

(a) means for fastening with a generally flat side;

(b) an upper washer and a lower washer constituting a pair of washers, where each washer has one side with cams and one generally flat side, the washer sides with cams being arranged facing each other, the generally flat upper side of the upper washer being arranged against the generally flat side of the means for fastening, the lower washer has a shoulder with a height; and (c) at least one means for containment arranged to keep together the means for fastening and the pair of washers, the at least one means for containment is arranged loosely on the means for fastening and the pair of washers, the at least one means for containment has a lower side with a flange arranged adjacent a surface to which the mounting element is arranged, the lower side of the flange of the means for containment is thinner than the height of the shoulder, whereby an air gap is defined between the lower side of the flange and the surface and the means for containment is allowed to move a certain axial amount and rotate in relation to at least one of the means for fastening and the pair of washers.

2. Mounting element according to claim 1, wherein the at least one means for containment is a sleeve.

3. Mounting element according to claim 1, wherein the means for fastening is a nut.

4. Mounting element according to claim 1, wherein the means for fastening is a bolt.

5. Mounting element according to claim 1, wherein the cams on the pair of washers have a height, whereby the certain axial amount is at least as great as the height of the cams on the pair of washers.

6. Mounting element according to claim 1, wherein the upper part of the means for containment has an upper flange that rests against a flange of the means for fastening.

7. A method of manufacturing a mounting element, the method comprising the steps of:

(a) providing means for fastening with a generally flat side and an upper washer and a lower washer constituting a pair of washers, where each washer has one side with cams and one generally flat side, the lower washer has a shoulder with a height;

(b) arranging the washers with the cams facing each other;

(c) arranging the generally flat upper side of the upper washer against the generally flat side of the means for fastening; and (d) arranging at least one means for containment on the means for fastening and the pair of washers to retain them together, the at least one means for containment being moveable on the means for fastening and the pair of washers, the at least one means for containment has a lower side with a flange arranged adjacent a surface to which the mounting element is arranged, the lower side of the flange of the means for containment is thinner than the height of the shoulder, whereby an air gap is defined between the lower side of the flange and the surface and the means for containment is allowed to move a certain axial amount and rotate in relation to at least one of the means for fastening and the pair of washers.

8. A method of manufacturing according to claim 7, wherein the at least one means for containment is a sleeve.

9. A method of manufacturing according to claim 7, wherein the means for fastening is a nut.

10. A method of manufacturing according to claim 7, wherein the means for fastening is a bolt.

11. A method of manufacturing according to claim 7, wherein the cams on the pair of washers have a height, whereby the certain axial amount is at least as great as the height of the cams on the pair of washers.

12. A method of manufacturing according to claim 7, wherein the upper part of the means for containment has an upper flange that rests against a flange of the means for fastening.

* * * * *